(12) United States Patent
O Brien et al.

(10) Patent No.: US 7,905,695 B2
(45) Date of Patent: Mar. 15, 2011

(54) METHODS AND APPARATUS FOR LOCKING ELEMENT

(75) Inventors: Joseph C. O Brien, Tucson, AZ (US); Eric J. Venghaus, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 579 days.

(21) Appl. No.: 11/941,154

(22) Filed: Nov. 16, 2007

(65) Prior Publication Data

US 2009/0126167 A1    May 21, 2009

(51) Int. Cl.
 *F16B 39/24* (2006.01)
 *F16B 43/02* (2006.01)
(52) U.S. Cl. ......... 411/149; 411/529; 411/539; 411/544
(58) Field of Classification Search .............. 411/147, 411/149, 154, 544, 121, 539, 523, 524, 522, 411/529, 132, 134, 142, 150, 151, 231, 129, 411/101
See application file for complete search history.

(56) References Cited

U.S. PATENT DOCUMENTS

| | | | | |
|---|---|---|---|---|
| 492,715 A * | 2/1893 | Dempsey | ...... | 411/231 |
| 911,063 A * | 2/1909 | Offutt et al. | ...... | 411/121 |
| 1,038,664 A * | 9/1912 | Schell | ...... | 411/523 |
| 1,067,125 A * | 7/1913 | Maney | ...... | 238/349 |
| 1,631,819 A * | 6/1927 | Ivory | ...... | 411/149 |
| 1,724,595 A * | 8/1929 | Hyle | ...... | 411/149 |
| 1,805,413 A * | 5/1931 | Norwood | ...... | 411/101 |
| 2,162,167 A * | 6/1939 | Greterman | ...... | 411/523 |
| 2,324,134 A * | 7/1943 | Chidester | ...... | 238/349 |
| 3,459,096 A * | 8/1969 | Parkin | ...... | 411/523 |
| 5,362,111 A * | 11/1994 | Harbin | ...... | 285/92 |

* cited by examiner

*Primary Examiner* — Flemming Saether
(74) *Attorney, Agent, or Firm* — Ingrassia Fisher & Lorenz, P.C.

(57) ABSTRACT

The disclosed system, device, and apparatus for a locking element generally includes a force device having a suitable shape to fit around a plurality of coupled elements. This re-usable force device reduces unwanted and unintended rotation of coupled elements. Disclosed features and specifications may be variously controlled, adapted, or otherwise optionally modified to realize improved locking function.

20 Claims, 3 Drawing Sheets

METHODS AND APPARATUS FOR LOCKING ELEMENT

The United States Government may have rights in this invention as provided under contract N00024-04-C0-5457 awarded by the Department of the Navy.

FIELD OF INVENTION

The present invention generally concerns locking systems and their components. More particularly, representative and exemplary embodiments of the present invention generally relate to systems, devices and methods for providing a securing force between a plurality of connectors.

BACKGROUND OF INVENTION

Equipment manufactures must generally provide for a backup system to locking torque to insure that couplers, screws, and connected articles are not separated due to vibration, temperature, stress, and other factors. Conventionally, connectors have been locked together using a safety wire. This safety wire must be manually threaded into eyelets located on the connectors and twisted closed. This delicate, intricate work is often times made more difficult due to lack of space as components are made smaller and grouped closer together. Additionally, this safety wire is generally cut after one implementation making re-use unlikely. Also, a griptol line is occasionally added between the connected devices to provide a visual cue to alert users of movement. However, this method must be periodically inspected and only indicates movement between the connectors rather than acting as a positive locking element. Accordingly, there exists a need for a locking device design that overcomes these and other deficiencies of the prior art.

SUMMARY OF THE INVENTION

In various representative aspects, the present invention provides a design for a force device that provides a locking function over a plurality of connected elements. Advantages of the present invention will be set forth in the Detailed Description which follows and may be apparent from the Detailed Description or may be learned by practice of exemplary embodiments of the invention. Still other advantages of the invention may be realized by means of any of the instrumentalities, methods or combinations particularly pointed out in the claims.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the detailed description, wherein:

Elements in the figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", "forward", "aft", and the like in the description and/or in the claims, if any, are generally employed for descriptive purposes and not necessarily for comprehensively describing exclusive relative position. Any of the preceding terms so used may be interchanged under appropriate circumstances such that various embodiments of the invention described herein, for example, may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventors' conception of the best mode, and are not intended to limit the scope, applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

Various representative implementations of the present invention may be applied to any connector locking system. Certain representative implementations may include, for example: a locking device sized suitably for any connector dimension; locking devices made out of any suitable material; changing the design of the locking elements; and/or the like. The present invention may provide a primary locking method or may be utilized as a stand alone or as one of many secondary locking devices.

A detailed description of an exemplary application, namely a locking element suitably designed for use with subminiature type connectors, is provided as a specific enabling disclosure that may be generalized to any application of the disclosed system and method for presenting a locking element between connectors in accordance with various embodiments of the present invention.

Figure 1:
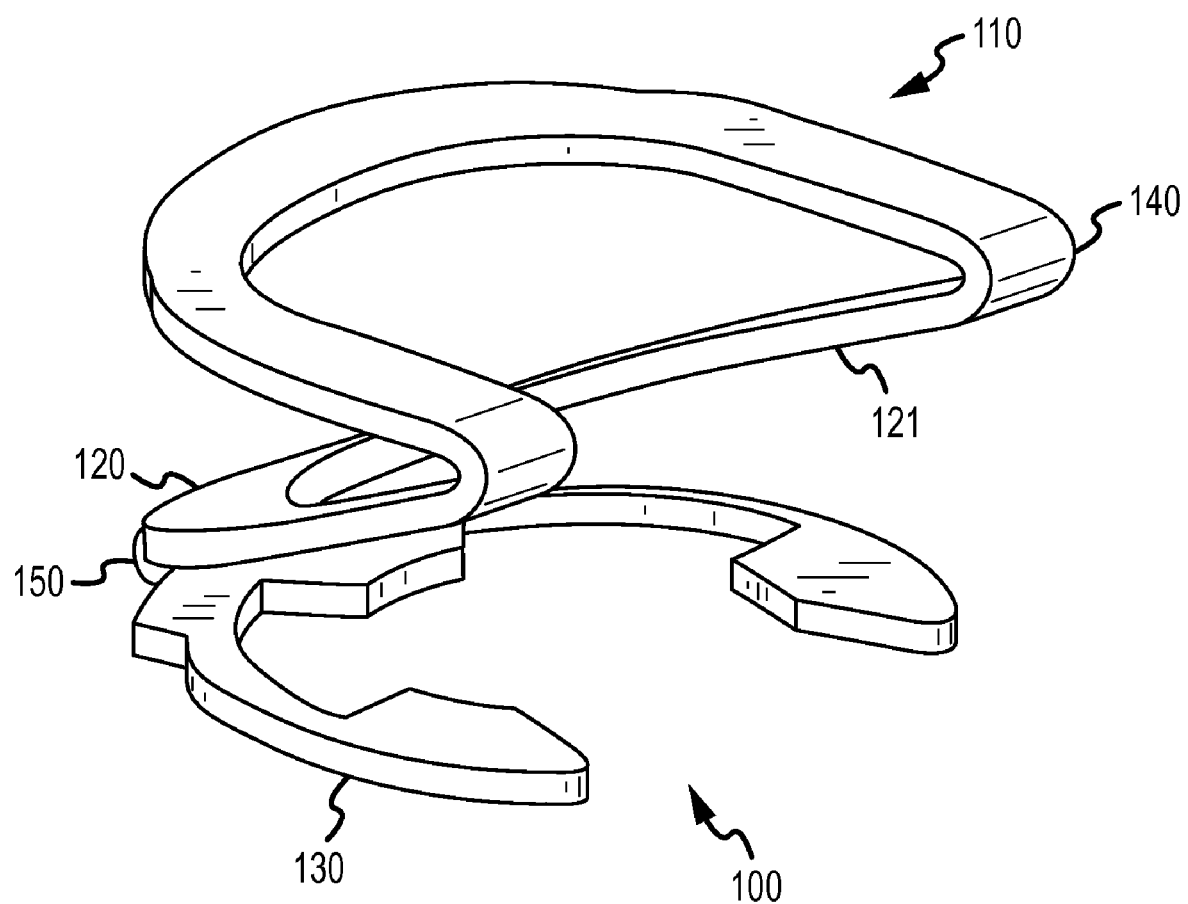
FIG. 1 representatively illustrates an isometric perspective view of a locking element in accordance with an exemplary embodiment, of the present invention.

FIG. 1 representatively illustrates an isometric perspective view of a locking element 100 in accordance with an exemplary embodiment of the present invention. Locking element 100 may be employed for any suitable purpose or application across connectors, such as providing a secondary locking force, and/or preventing movement due to vibration, stress, temperature change, and/or the like.

For example, locking element 100 may be integrated into applications utilizing subminiature couplers, which may include a threaded outer coupling, snap type fitting, and/or the like. These subminiature connectors are used for providing connectivity between boards, and many microwave components, including but not limited to, filters, attenuators, mixers, and oscillators. Locking element 100 may provide secondary a locking force to a plurality of couplers. Alternatively, locking element 100 may be used in other applications and environments for couplers with various power ratings and types such as N, TNC, BNC, QMA, MCX, and/or the like. Additionally, locking element 100 may be integrated into alternative coupling applications, such as directional couplers, straight bulkhead jack receptacles, square flange receptacles, straight jack receptacles, reverse polarity couplers, and/or the like.

In the present embodiment, locking element 100 may comprise a top ring 110, a support structure 120 and a base ring 130. A support structure 120, which may comprise at least one strut 121, may couple the top ring 110 to base ring 130. The top ring 110 and the base ring 130 may comprise any appropriate components for the locking element 100.

In one embodiment, top ring 110, may be U shaped to allow for quick application across connected elements. The interior radius of top ring 110 may be suitably sized to fit snuggly around the exterior of the coupler it is designed to secure. This is not limiting of the invention and other attachment methods shall be implemented if necessary to attach top ring 110 to the connector. The exterior edge of top ring 110 can be shaped in any configuration with suitable width and depth. In FIG. 1, one embodiment of top ring 110 is shown to have a U shaped exterior edge, with a depth and thickness suitably designed to provide the robustness needed to secure a plurality of couplers over multiple applications. In the present embodiment, top ring 110 is shown having a substantially flat top surface. This flat surface is generally designed to be a point of contact between the locking element 100 and one end of the coupler locking element 100. In the present embodiment, the open ends of top ring 110 will be connected by top ring hinge 140 to support structure 120.

Top ring hinge 140 is the point of connection between top ring 110 and support structure 120. In the present embodiment, top ring hinge 140 is designed to be a deformable body that bends and reforms to its initial configuration. Top ring hinge can be constructed out of any suitable material, but in the present embodiment it is constructed out of the same materials as top ring 110 and support structure 120 elements. Top ring hinge 140 will be designed for compression that allows for attachment between two couplers.

Support structure 120 is designed to connect top ring 110 to bottom ring 130. It may be designed in any suitable configuration, shape, or material to perform this function. It may employ pistons, coils, deformable bodies, and/or the like. In the present embodiment, support structure 120 comprises a plurality of support struts 121 that are an equal thickness and width to top ring 110. Support strut 121 is suitably designed to connect top ring hinge 140 to bottom ring hinge 150. Support strut 121 is designed so as to not interfere with the elements locking device 100 is designed to secure. Support strut 121 is representatively illustrated with 2 continuous protrusions toward bottom ring hinge 150. This is not limiting of the invention, and any number of protrusions may be formed and remain within the scope of the present invention.

In an exemplary embodiment, bottom ring hinge 150 is the point of connection between bottom ring 130 and support struts 121. Bottom ring hinge 150 is designed to be a deformable body that bends and reforms to its initial configuration. Bottom ring hinge 150 can be constructed out of any suitable material, but in the present embodiment it is constructed out of the same materials as base ring 130 and support structure 120 elements. Bottom ring hinge 150 will be designed for compression that allows for attachment between two couplers.

Base ring 130 may include any structure or apparatus that serves to connect locking device 100 to a coupler. In one embodiment, base ring 130 is designed fit circumferentially around the end of a coupler. The base ring 130 interior is suitably designed to have at least one point of contact with the exterior of the coupler. Additionally, if available, the bottom surface of base ring 130 shall be suitably designed for connection located at a point of surface change on the coupler. One example of a surface change would be changing from substantially circular exterior to a hexagon shape. This is not limiting of the invention and other attachment methods shall be implemented if no point of surface change is available.

In the present embodiment, locking element 100 operation is as follows. The ends of two coupled elements are connected. Locking element 100 is suitably sized to fit around the coupled pairing. Locking element 100 is suitably compressed so that its ends fit inside their designed points of contact with the coupled elements. Locking element 100 expands to its unloaded shape. This expansion, or engaging, presents a force on the coupled elements in the direction away from the point of connection between the coupled elements. This force is designed to reduce unwanted rotation of the coupled elements. The coupled elements should be tightened to their desired torque. A griptol line or other locking methods or indicators may now be applied to the coupled elements, as locking element 100 does not wrap completely around the circumference of the coupled elements. When desired, locking element 100 may be removed by compressing top ring 110 toward base ring 130 and by pulling locking element 100 away perpendicularly from the coupled elements. The coupled elements can be loosened according to their design parameters enabling locking element 100 for re-use.

Figure 2:
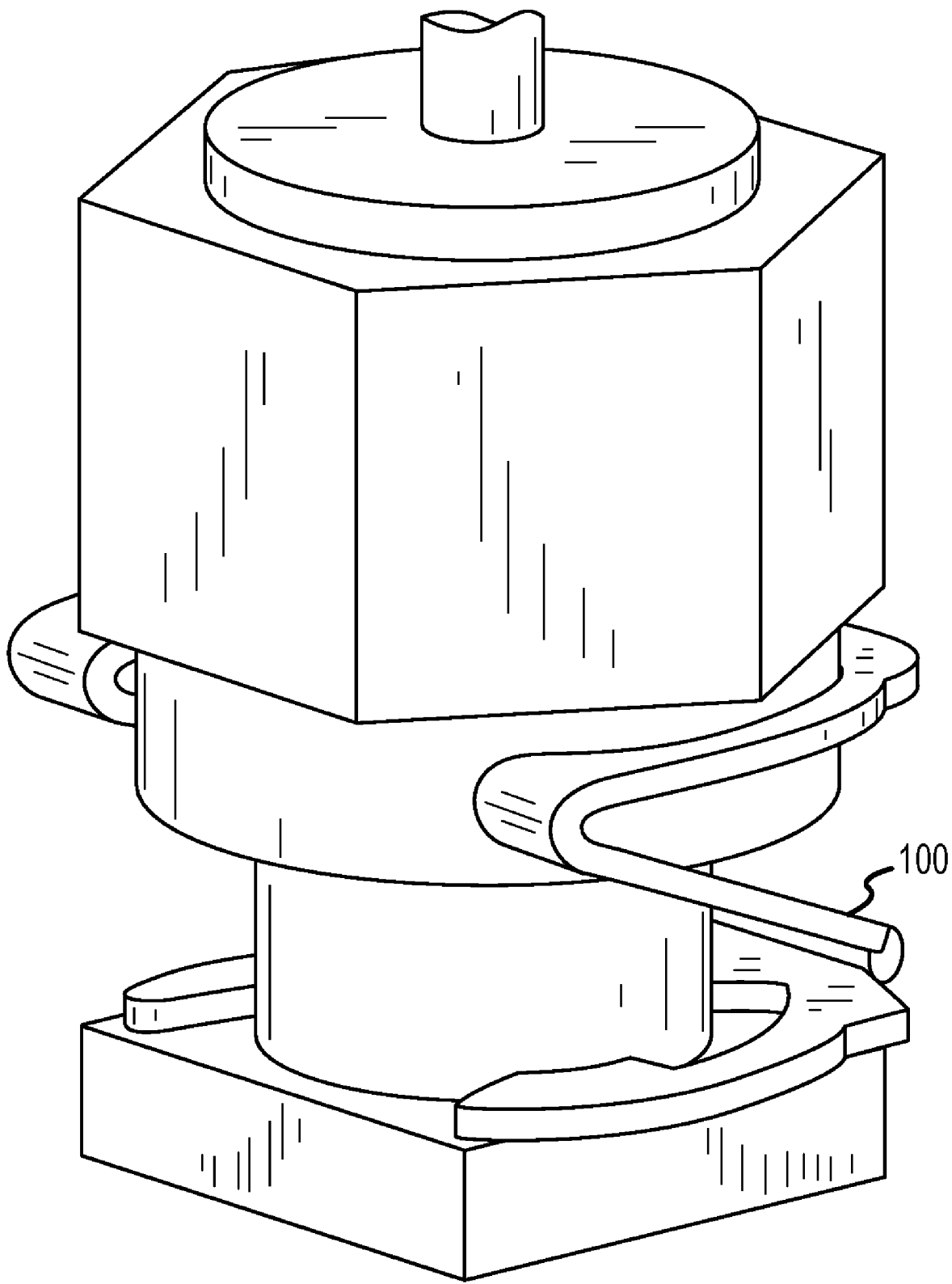
FIG. 2 representatively illustrates an isometric perspective view of a locking element around a plurality of subminiature type connectors in accordance with an exemplary embodiment of the present invention.

FIG. 2 representatively illustrates the present embodiment of locking device 100 engaged around a plurality of fastened subminiature type connectors in accordance with an exemplary embodiment of the present invention. The elements of locking device 100 shall be suitably designed so that the force presented across the connected couplers is sufficiently large to reduce unwanted rotation of couplers.

Figure 3:
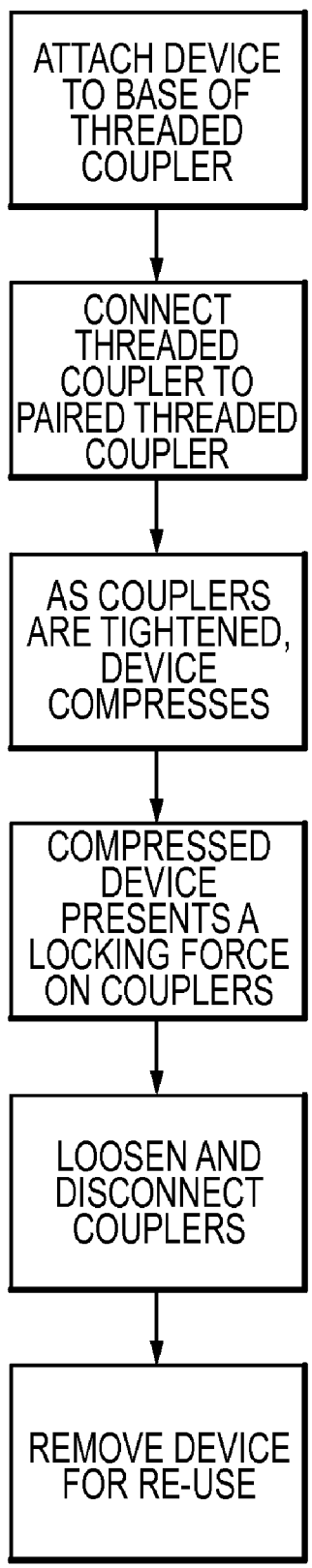
FIG. 3 representatively illustrates an operation flow chart in accordance with an exemplary embodiment of the present invention.

Referring to FIG. 3, in a representative embodiment, the locking element 100 may be attached to the base of a threaded coupler. The threaded coupler may then be connected to another threaded coupler to make a pair of threaded couplers. The connection between the paired threaded couplers may then be tightened, compressing locking element 100. This compression exerts a locking force onto the paired threaded couplers. The couplers may then be loosened and disconnected, which would then allow locking element 100 to be removed and reused.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims. As used herein, the terms "comprising", "having", "including", or any contextual variant thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A force device suitably adapted for use between a plurality of couplers, comprising:
   a first substantially U shaped base;
   a second substantially U shaped base; and
   a flexible support structure connecting the first substantially U shaped base to the second substantially U shaped base,
   wherein said force device is placed around connecting surfaces of a plurality of couplers; and
   said force device is configured to:
   contract and present a locking force on the couplers as tightening torque is applied to the couplers; and
   expand when said tightening torque forces are removed, and
   wherein said first and second substantially U shaped bases are aligned and spaced along a common axis with the openings of the U shapes being transverse to said common axis so that said force device can be moved radially into position around the connecting surfaces.

2. The force device of claim 1, wherein said connection is made between a plurality of couplers and the force device is engaged, a locking force is applied between a plurality of couplers.

3. The force device of claim 1, wherein the first substantially U shaped base of said force device is suitably sized to attach to said coupler at a point of surface change of the coupler.

4. The force device of claim 1, wherein the force device is designed to allow the outer surfaces of a plurality of couplers to pass through until a point of surface change of the coupler.

5. The force device of claim 1, wherein said force device is further configured as a reusable device.

6. The force device of claim 5, wherein said force device restricts vibration induced separation of the couplers when engaged between a plurality of couplers.

7. The force device of claim 5, wherein said force device restricts cyclic motion induced separation of the couplers when engaged between a plurality of couplers.

8. The force device of claim 5, wherein said force device restricts undesired separation of the couplers when engaged between a plurality of couplers.

9. The force device of claim 1, wherein said force device may be applied to the connected couplers after initial connection between a plurality of couplers is established.

10. The force device of claim 1, wherein said force device does not require additional manual manipulation once attached at the base of a coupler.

11. The force device of claim 1, wherein said force device does not completely obscure the outer surface of the couplers when engaged between a plurality of couplers.

12. A mechanical locking system suitably adapted for use around a plurality of threaded couplers, comprising:
    a first substantially U shaped base;
    a second substantially U shaped base; and
    a flexible support structure connecting the first substantially U shaped base to the second substantially U shaped base,
    wherein said mechanical locking device is placed around connecting surfaces of a plurality of threaded fasteners and said mechanical locking device is configured to:
    contract as tightening torque is applied to the threaded fasteners, and
    expand when said tightening torque forces are removed, and
    wherein said first and second substantially U shaped bases are aligned and spaced along a common axis with the openings of the U shapes being transverse to said common axis so that said force device can be moved radially into position around the connecting surfaces.

13. The mechanical locking system of claim 12, wherein said threaded couplers comprises subminiature connectors.

14. The mechanical locking system of claim 12, wherein said mechanical locking system is further configured as a reusable device.

15. The mechanical locking system of claim 12, wherein the force application device is engaged, a locking force is applied between a plurality of subminiature connectors.

16. The mechanical locking system of claim 15, wherein said force application device restricts vibration induced separation of the subminiature connectors when engaged.

17. The mechanical locking system of claim 15, wherein said force application device restricts cyclic motion induced separation of the subminiature connectors when engaged.

18. The mechanical locking system of claim 15, wherein said force application device restricts undesired separation of the subminiature connectors when engaged.

19. The mechanical locking system of claim 12, wherein said force application device may be applied to a plurality of connected subminiature connectors after initial connection between a plurality of subminiature connectors is established.

20. The mechanical locking system of claim 12, wherein said force application device requires no additional manual manipulation once attached at the base of a subminiature connector.

* * * * *